(12) United States Patent
Chakerian et al.

(10) Patent No.: US 9,298,678 B2
(45) Date of Patent: Mar. 29, 2016

(54) SYSTEM AND METHOD FOR NEWS EVENTS DETECTION AND VISUALIZATION

(71) Applicant: PALANTIR TECHNOLOGIES INC., Palo Alto, CA (US)

(72) Inventors: John Chakerian, Los Altos Hills, CA (US); Robert Fink, Canberra (AU); Mark Schafer, New York, NY (US); James Thompson, San Francisco, CA (US); Marvin Sum, Sunnyvale, CA (US); Allen Cai, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/326,738

(22) Filed: Jul. 9, 2014

(65) Prior Publication Data
US 2016/0004667 A1   Jan. 7, 2016

Related U.S. Application Data

(63) Continuation of application No. 14/323,935, filed on Jul. 3, 2014.

(51) Int. Cl.
*G06F 7/02* (2006.01)
*G06F 17/30* (2006.01)
(Continued)

(52) U.S. Cl.
CPC .......... *G06F 17/212* (2013.01); *G06F 3/04842* (2013.01); *G06F 17/30011* (2013.01); *G06F 17/30598* (2013.01); *G06F 17/30705* (2013.01)

(58) Field of Classification Search
CPC ................. G06F 17/30011; G06F 17/30598; G06F 17/30705; G06F 17/3071; G06F 17/30699
See application file for complete search history.

(56) References Cited

U.S. PATENT DOCUMENTS

| 5,109,399 A | 4/1992 | Thompson |
|---|---|---|
| 5,329,108 A | 7/1994 | Lamoure |

(Continued)

FOREIGN PATENT DOCUMENTS

| DE | 102014103482 | 9/2014 |
|---|---|---|
| DE | 102014215621 | 2/2015 |

(Continued)

OTHER PUBLICATIONS

Boyce, Jim, "Microsoft Outlook 2010 Inside Out," Aug. 1, 2010, retrieved from the internet https://capdtron.files.wordpress.com/2013/01/outlook-2010-inside_out.pdf.

(Continued)

*Primary Examiner* — Bruce Moser
(74) *Attorney, Agent, or Firm* — Finnegan, Henderson, Farabow, Garrett & Dunner, LLP

(57) ABSTRACT

Systems and methods are disclosed for news events detection and visualization. In accordance with one implementation, a method is provided for news events detection and visualization. The method includes, for example, obtaining one or more user inputs, determining, based on the user inputs, an entity and a date range, obtaining one or more documents associated with the entity and with dates within the date range, the one or more documents being grouped into one or more clusters, and the clusters being grouped into one or more megaclusters, and presenting the one or more documents on one or more timelines, wherein the one or more documents are grouped into different megaclusters being presented in a visually distinct way. The method further allows for filtering of the one or more clusters based on a value associated with the one or more clusters.

15 Claims, 5 Drawing Sheets

(51) Int. Cl.
  *G06F 17/21* (2006.01)
  *G06F 3/0484* (2013.01)

(56) References Cited

U.S. PATENT DOCUMENTS

| | | | |
|---|---|---|---|
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,845,300 A | 12/1998 | Comer | |
| 6,057,757 A | 5/2000 | Arrowsmith et al. | |
| 6,091,956 A | 7/2000 | Hollenberg | |
| 6,161,098 A | 12/2000 | Wallman | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,456,997 B1 | 9/2002 | Shukla | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,714,936 B1 | 3/2004 | Nevin, III | |
| 6,775,675 B1 | 8/2004 | Nwabueze et al. | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,976,210 B1 | 12/2005 | Silva et al. | |
| 6,980,984 B1 | 12/2005 | Huffman et al. | |
| 6,985,950 B1 | 1/2006 | Hanson et al. | |
| 7,036,085 B2 | 4/2006 | Barros | |
| 7,043,702 B2 | 5/2006 | Chi et al. | |
| 7,055,110 B2 | 5/2006 | Kupka et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witkowski | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,451,397 B2 | 11/2008 | Weber et al. | |
| 7,454,466 B2 | 11/2008 | Bellotti et al. | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,232 B2 | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,703,021 B1 | 4/2010 | Flam | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,770,100 B2 | 8/2010 | Chamberlain et al. | |
| 7,805,457 B1 | 9/2010 | Viola et al. | |
| 7,809,703 B2 | 10/2010 | Balabhadrapatruni et al. | |
| 7,818,658 B2 | 10/2010 | Chen | |
| 7,894,984 B2 | 2/2011 | Rasmussen et al. | |
| 7,899,611 B2 | 3/2011 | Downs et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,941,321 B2 | 5/2011 | Greenstein et al. | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,970,240 B1 | 6/2011 | Chao et al. | |
| 7,971,150 B2 | 6/2011 | Raskutti et al. | |
| 7,984,374 B2 | 7/2011 | Caro et al. | |
| 8,001,465 B2 | 8/2011 | Kudrolli et al. | |
| 8,001,482 B2 | 8/2011 | Bhattiprolu et al. | |
| 8,010,545 B2 | 8/2011 | Stefik et al. | |
| 8,015,487 B2 | 9/2011 | Roy et al. | |
| 8,024,778 B2 | 9/2011 | Cash et al. | |
| 8,036,632 B1 | 10/2011 | Cona et al. | |
| 8,103,543 B1 | 1/2012 | Zwicky | |
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,196,184 B2 | 6/2012 | Amirov et al. | |
| 8,214,361 B1 | 7/2012 | Sandler et al. | |
| 8,214,764 B2 | 7/2012 | Gemmell et al. | |
| 8,225,201 B2 | 7/2012 | Michael | |
| 8,229,947 B2 | 7/2012 | Fujinaga | |
| 8,230,333 B2 | 7/2012 | Decherd et al. | |
| 8,280,880 B1 | 10/2012 | Aymeloglu et al. | |
| 8,290,926 B2 * | 10/2012 | Ozzie et al. | 707/708 |
| 8,290,942 B2 | 10/2012 | Jones et al. | |
| 8,301,464 B2 | 10/2012 | Cave et al. | |
| 8,301,904 B1 | 10/2012 | Gryaznov | |
| 8,312,367 B2 | 11/2012 | Foster | |
| 8,312,546 B2 | 11/2012 | Alme | |
| 8,352,881 B2 | 1/2013 | Champion et al. | |
| 8,368,695 B2 | 2/2013 | Howell et al. | |
| 8,397,171 B2 | 3/2013 | Klassen et al. | |
| 8,412,707 B1 | 4/2013 | Mianji | |
| 8,447,722 B1 | 5/2013 | Ahuja et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,514,082 B2 | 8/2013 | Cova et al. | |
| 8,515,207 B2 | 8/2013 | Chau | |
| 8,554,579 B2 | 10/2013 | Tribble et al. | |
| 8,554,709 B2 | 10/2013 | Goodson et al. | |
| 8,577,911 B1 | 11/2013 | Stepinski et al. | |
| 8,589,273 B2 | 11/2013 | Creeden et al. | |
| 8,620,641 B2 | 12/2013 | Farnsworth et al. | |
| 8,646,080 B2 | 2/2014 | Williamson et al. | |
| 8,676,857 B1 | 3/2014 | Adams et al. | |
| 8,689,108 B1 | 4/2014 | Duffield et al. | |
| 8,713,467 B1 | 4/2014 | Goldenberg et al. | |
| 8,726,379 B1 | 5/2014 | Stiansen et al. | |
| 8,739,278 B2 | 5/2014 | Varghese | |
| 8,742,934 B1 | 6/2014 | Sarpy et al. | |
| 8,745,516 B2 | 6/2014 | Mason et al. | |
| 8,781,169 B2 | 7/2014 | Jackson et al. | |
| 8,787,939 B2 | 7/2014 | Papakipos et al. | |
| 8,799,799 B1 | 8/2014 | Cervelli et al. | |
| 8,812,960 B1 | 8/2014 | Sun et al. | |
| 8,830,322 B2 | 9/2014 | Nerayoff et al. | |
| 8,832,594 B1 | 9/2014 | Thompson et al. | |
| 8,868,537 B1 | 10/2014 | Colgrove et al. | |
| 8,917,274 B2 | 12/2014 | Ma et al. | |
| 8,924,872 B1 | 12/2014 | Bogomolov et al. | |
| 8,937,619 B2 | 1/2015 | Sharma et al. | |
| 8,938,686 B1 | 1/2015 | Erenrich et al. | |
| 9,009,171 B1 | 4/2015 | Grossman et al. | |
| 9,009,827 B1 | 4/2015 | Albertson et al. | |
| 9,021,260 B1 | 4/2015 | Falk et al. | |
| 9,021,384 B1 | 4/2015 | Beard et al. | |
| 2002/0033848 A1 | 3/2002 | Sciammarella et al. | |

(56) References Cited

U.S. PATENT DOCUMENTS

| | | |
|---|---|---|
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0163039 A1 | 8/2004 | Gorman |
| 2004/0193600 A1* | 9/2004 | Kaasten et al. ............... 707/7 |
| 2004/0205524 A1 | 10/2004 | Richter et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0149596 A1 | 7/2006 | Surpin et al. |
| 2006/0203337 A1 | 9/2006 | White |
| 2006/0209085 A1 | 9/2006 | Wong et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |

(56) References Cited

U.S. PATENT DOCUMENTS

| | | |
|---|---|---|
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1* | 7/2012 | Tsukidate ............... 382/190 |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0197651 A1* | 8/2012 | Robinson ............. G06Q 30/02 705/1.1 |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097482 A1 | 4/2013 | Marantz et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0157234 A1* | 6/2013 | Gulli et al. ............... 434/154 |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0324868 A1* | 11/2015 | Kaftan ............... G06Q 30/0277 707/750 |

FOREIGN PATENT DOCUMENTS

| | | |
|---|---|---|
| EP | 1672527 | 6/2006 |
| EP | 2551799 | 1/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Definition "Identify" downloaded Jan. 22, 2015, 1 page.

Definition "Overlay" downloaded Jan. 22, 2015, 1 page.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Li et al., "Interactive Multimodal Visual Search on Mobile Device," IEEE Transactions on Multimedia, vol. 15, No. 3, Apr. 1, 2014, pp. 594-607.

Nierman, "Evaluating Structural Similarity in XML Documents," 2002, 6 pages.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Umagandhi et al., "Search Query Recommendations Using Hybrid User Profile with Query Logs," International Journal of Computer Applications, vol. 80, No. 10, Oct. 1, 2013, pp. 7-18.

(56) References Cited

OTHER PUBLICATIONS

Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
Official Communication for Australian Patent Application No. 2014201511 dated Feb. 27, 2015.
Official Communication for Australian Patent Application No. 2014202442 dated Mar. 19, 2015.
Official Communication for European Patent Application No. 14180281.9 dated Jan. 26, 2015.
Official Communication for European Patent Application No. 14180142.3 dated Feb. 6, 2015.
Official Communication for European Patent Application No. 14187996.5 dated Feb. 12, 2015.
Official Communication for European Patent Application No. 14186225.0 dated Feb. 13, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14199182.8 dated Mar. 13, 2015.
Official Communication for European Patent Application No. 14180321.3 dated Apr. 17, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14189802.3 dated May 11, 2015.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Notice of Allowance for U.S. Appl. No. 14/192,767 dated Dec. 16, 2014.
Notice of Allowance for U.S. Appl. No. 14/294,098 dated Dec. 29, 2014.
Notice of Allowance for U.S. Appl. No. 14/473,860 dated Jan. 5, 2015.
Notice of Allowance for U.S. Appl. No. 14/616,080 dated Apr. 2, 2015.
Notice of Allowance for U.S. Appl. No. 14/486,991 dated May 1, 2015.
Notice of Allowance for U.S. Appl. No. 14/225,084 dated May 4, 2015.
Notice of Allowance for U.S. Appl. No. 14/504,103 dated May 18, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/504,103 dated Feb. 5, 2015.
Official Communication for U.S. Appl. No. 14/225,160 dated Feb. 11, 2015.
Official Communication for U.S. Appl. No. 14/306,138 dated Feb. 18, 2015.
Official Communication for U.S. Appl. No. 14/306,147 dated Feb. 19, 2015.
Official Communication for U.S. Appl. No. 14/225,084 dated Feb. 20, 2015.
Official Communication for U.S. Appl. No. 14/473,552 dated Feb. 24, 2015.
Official Communication for U.S. Appl. No. 14/225,006 dated Feb. 27, 2015.
Official Communication for U.S. Appl. No. 13/831,791 dated Mar. 4, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 14/504,103 dated Mar. 31, 2015.
Official Communication for U.S. Appl. No. 14/323,935 dated Mar. 31, 2015.
Official Communication for U.S. Appl. No. 14/326,738 dated Mar. 31, 2015.
Official Communication for U.S. Appl. No. 14/148,568 dated Mar. 26, 2015.
Official Communication for U.S. Appl. No. 13/247,987 dated Apr. 2, 2015.
Restriction Requirement for U.S. Appl. No. 13/839,026 dated Apr. 2, 2015.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," May 1, 2008, pp. 15.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-.Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014,<http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.

(56) References Cited

OTHER PUBLICATIONS

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the.Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%028v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Palmas et al., "An Edge-Bunding Layout for Interactive Parallel Coordinates" 2014 IEEE Pacific Visualization Symposium, 2014, pp. 57-64.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Vose et al., "Help File for ModelRisk Version 5," 2007, Vose Software, pp. 349-353. [Uploaded in 2 Parts].
Issue Notification for U.S. Appl. No. 13/917,571 dated Aug. 5, 2014.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Application No. 628495 dated Aug. 19, 2014.
Official Communication for United Kingdom Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.

* cited by examiner

SYSTEM AND METHOD FOR NEWS EVENTS DETECTION AND VISUALIZATION

REFERENCE TO RELATED APPLICATION

This application is a continuation of U.S. Non-Provisional patent application Ser. No. 14/323,935, filed on Jul. 3, 2014, the disclosure of which is expressly incorporated herein by reference in its entirety.

BACKGROUND

Vast amounts of data are readily available to readers, analysts, and researchers today, on the one hand allowing them to perform more complicated and detailed data analyses than ever, but on the other hand making it more difficult to quickly sort through the data. Automatically characterizing, grouping, and visually presenting the data in a concise and informative way can help users to identify data that is most relevant for their particular needs.

BRIEF DESCRIPTION OF THE DRAWINGS

Reference will now be made to the accompanying drawings, which illustrate exemplary embodiments of the present disclosure. In the drawings.

DESCRIPTION OF EXEMPLARY EMBODIMENTS

Figure 1:
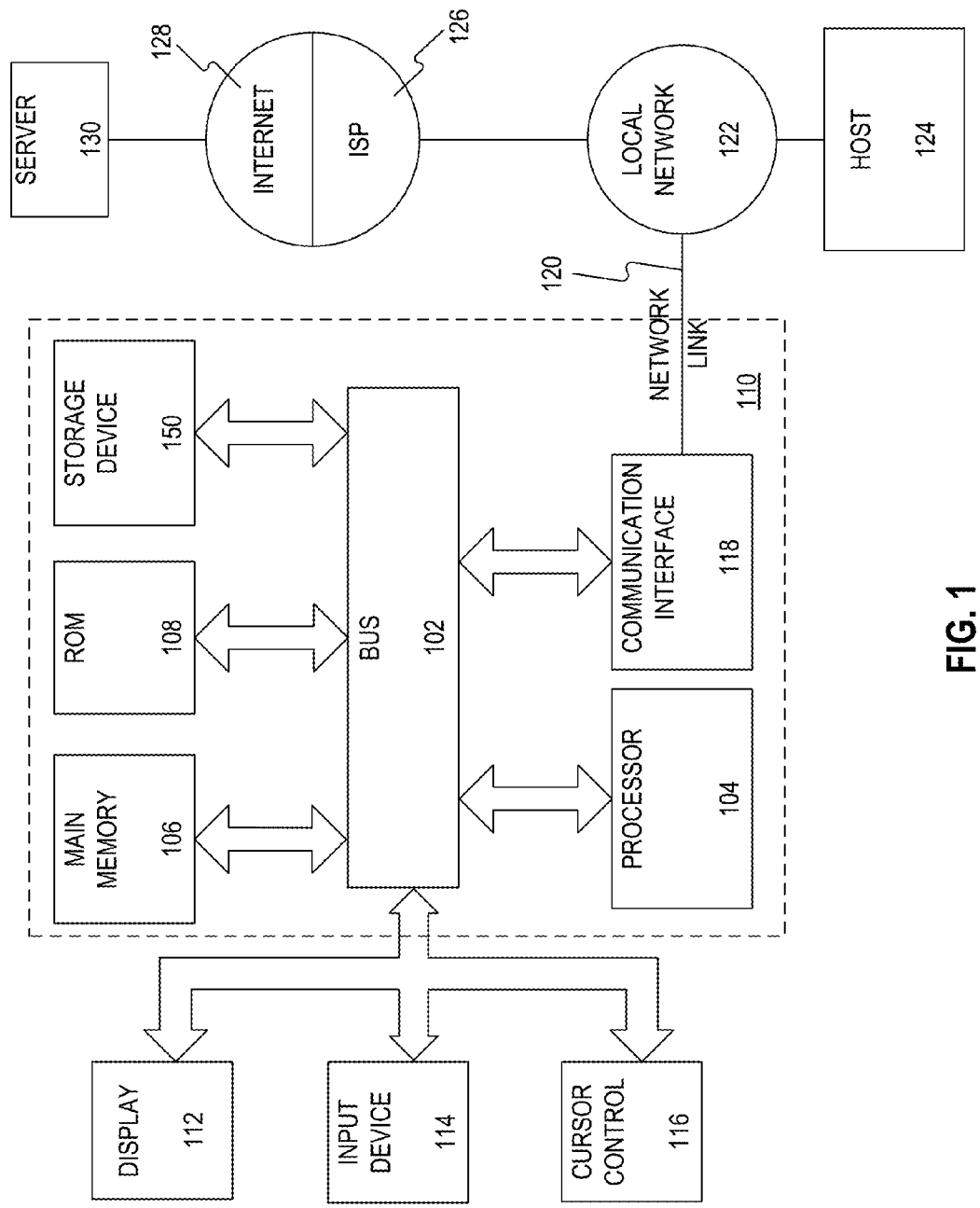
FIG. 1 is a block diagram of an exemplary electronic device, consistent with embodiments of the present disclosure.

Reference will now be made in detail to several exemplary embodiments of the present disclosure, including those illustrated in the accompanying drawings. Whenever possible, the same reference numbers will be used throughout the drawings to refer to the same or like parts.

Embodiments disclosed herein are directed to, among other things, to systems and methods that can analyze large volumes of documents (e.g., news articles), automatically group the documents into clusters (e.g., news events), further group the clusters into megaclusters (e.g., news storylines), and present the documents, the clusters, and the megaclusters to the user in a concise and informative manner. For example, the systems and methods can obtain a document, obtain from the document a plurality of tokens, obtain a document vector based on a plurality of frequencies associated with the plurality of tokens, obtain one or more clusters of documents, each cluster associated with a plurality of documents and a cluster vector, determine a matching cluster from the one or more clusters based at least on the similarity between the document vector and the cluster vector of the matching cluster, and update a database to associate the document with the matching cluster.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

By way of example, FIG. 1 is a block diagram that illustrates an implementation of an electronic device 110, which, as described above, can comprise one or more electronic devices. Electronic device 110 includes a bus 102 or other communication mechanism for communicating information, and one or more hardware processors 104, coupled with bus 102 for processing information. One or more hardware processors 104 can be, for example, one or more microprocessors.

Electronic device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 110 into a special-purpose machine that is customized to perform the operations specified in the instructions.

Electronic device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Electronic device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to electronic device 110 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from electronic device 110, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122 and communication interface 118.

The received code can be executed by processor 104 as it is received, and/or stored in storage device 150, or other non-volatile storage for later execution.

Figure 2:
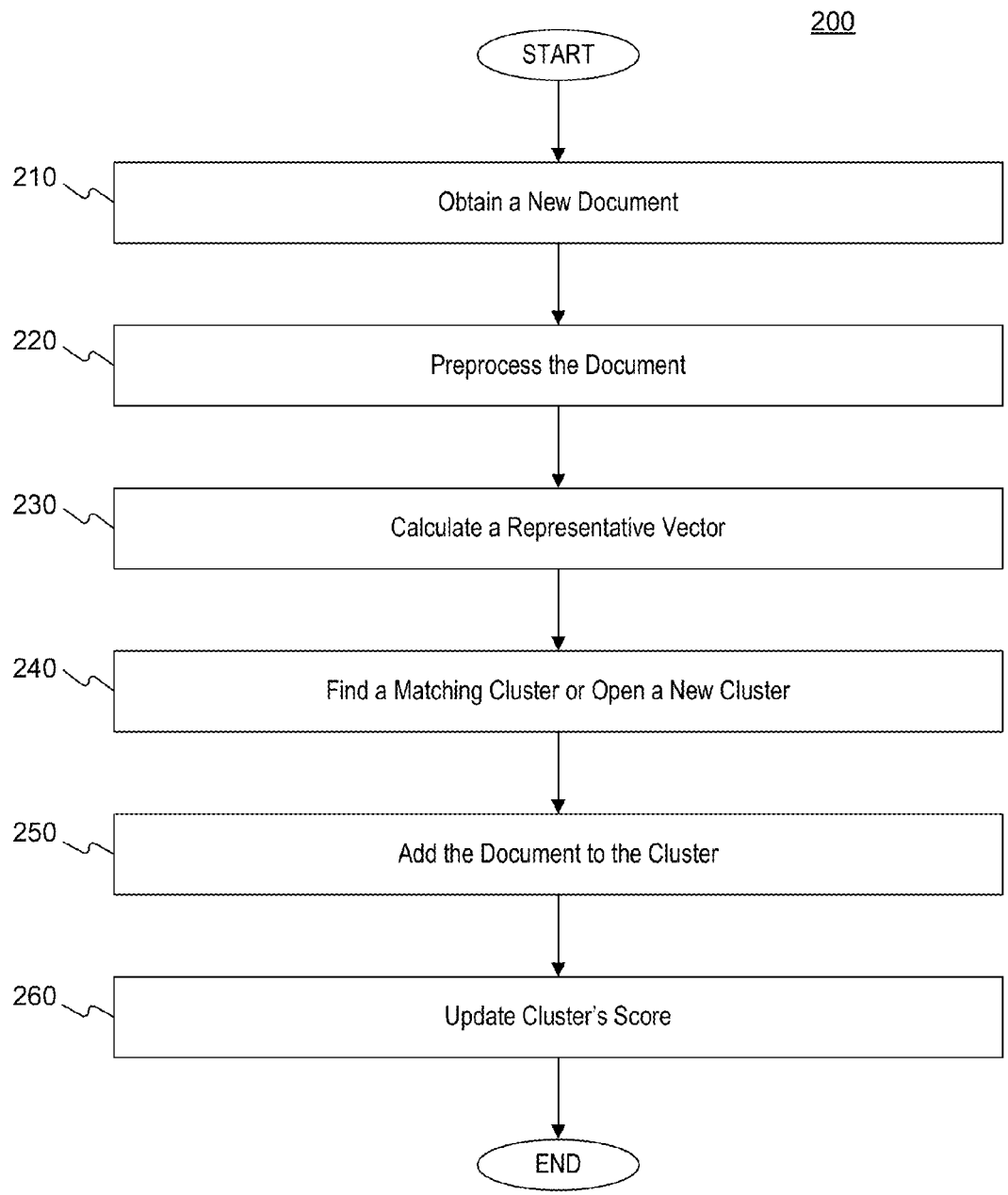
FIG. 2 is a flowchart of an exemplary method for clustering documents, consistent with embodiments of the present disclosure.

FIG. 2 shows a flowchart representing an exemplary method 200 for clustering documents. In some embodiments, method 200 can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, method 200 can be performed by one or more electronic devices, such as electronic device 110. And while method 200 and the other following embodiments described herein can be performed by multiple electronic devices each having one or more processors, for purposes of simplicity and without limitation, these embodiments will be explained with respect to a single electronic device (e.g., electronic device 110). While the flowchart discloses the following steps in a particular order, it is appreciated that at least some of the steps can be moved, modified, or deleted where appropriate, consistent with the teachings of the present disclosure.

Referring to FIG. 2, at step 210, the electronic device obtains a new document. The electronic device can obtain the new document from one or more databases that can be stored locally at the electronic device and/or on one or more remote devices. The document can be of any type of digital format (e.g., HTML, PDF, MS Word, Email, or any other format containing digital text) and can originate from any public or private source, for example, from an Internet webpage, a library archive, a proprietary subscription-based archive such as IEEE Xplore® digital library, Dow Jones's Factiva collection of news articles, or any other source of information. The document can also be obtained from search results returned by a search engine in response to a search query.

In some embodiments, the electronic device can obtain the document by periodically (e.g., once a day, once a week, once a month, etc.) searching a document database for any updates including new documents not previously processed by the electronic device. In other embodiments, the document can be submitted or pushed to the electronic device by a source system (e.g., blablubb). In other embodiments, the electronic device can obtain the document responsive to an input received from the user, the input identifying the requested document. In some embodiments, the obtained document can be associated, among other things, with a title, a URL, a revision number, provenance information, and a date, such as the date of its publication, the date of its most recent update, and so forth.

In some embodiments, the document can also be associated with one or more entities, such as one or more companies, persons, political parties, organizations, groups, or industries, or any other concept or topic, such as geographic locations. For example, the document can be associated with one or more tags, codes, or other types of metadata that describes products, companies, and/or industries related to the document, for example, all products, companies, and/or industries discussed in the document, or only key products, companies, and/or industries to which the document was directed. As an example, a news article discussing a new iPhone device being released by Apple Inc., can be pre-tagged (e.g., automatically or manually by a person) with one or more tags or codes such as "iPhone," "Apple," "AAPL," "consumer electronics," and the like. The document may also be associated with tags or codes from the source system marking subject, document types, document importance, etc. In some embodiments, the document can be stored in a data structure indexed by document ID.

At step 220, the electronic device can preprocess the obtained document. For example, the electronic device can obtain the text of the document and break it down into tokens. In some embodiments, each token can include one word. In other embodiments, each token can include parts of word, a transformed or a canonicalized word, or sequences of two or more words. In some embodiments, the electronic device can discard any tokens that do not correspond to predetermined types of speech. For example, the electronic device can keep only those tokens that correspond to nouns and verbs, and discard all other tokens such as adjectives, adverbs, prepositions, articles, etc. In some embodiments, the electronic device can also normalize the document by reducing each token to its morphological root or lemma, using any suitable stemming and/or lemmatization methods.

At step 230, the electronic device can calculate a document vector representing the document. In some embodiments, the electronic device calculates the document vector by analyzing the preprocessed tokens and calculates, for each preprocessed token, a frequency value. In some embodiments, the frequency value can be calculated as a term frequency-inverse document frequency ratio (TF/IDF) where TF can reflect the number of times a token occurs in the obtained document. TF can be represented as a frequency, a Boolean frequency, a logarithmically scaled frequency, or an augmented frequency. IDF can reflect how common or rare the term is across a large corpus of documents. Accordingly, the TF/IDF measure can reflect how important a particular token is to a document because it increases proportionally to the number of times a token appears in the document, but is offset by the frequency of the token in the corpus, which helps to control for the fact that some tokens are generally more common than others.

In some embodiments, the electronic device can obtain the IDF portion of the TF/IDF ratio from a statistical model that reflects frequencies of various tokens in a corpus of documents. In some embodiments, multiple statistical models can be available (e.g., stored on or remotely accessible by the electronic device), each statistical model associated with and generated based on a different corpus of documents, where each corpus of documents can be associated with a particular entity, such as a particular person, company, industry, etc. For example, a corpus of documents can contain only documents that were tagged or coded with a code corresponding to a particular entity. As another example, the corpus of documents can contain search results corresponding to a search query related to a particular entity. In these embodiments, the electronic device can select, among the various statistical models, a statistical model that is associated with (was generated based on) a corpus of documents associated with an entity with which the obtained document is associated. For example, if the obtained document is coded with a code "AAPL," the electronic device can calculate the IDF value based on a statistical model generated based on a corpus of documents also coded with the code "AAPL." In some embodiments, the electronic device can also update the statistical model to reflect the segment frequencies in the obtained document, if it does not already reflect them.

Still referring to step 230, the electronic device can calculate frequency values for all non-discarded tokens in the document, the frequency values together constituting, for example, a vector of frequency values, the vector representing the document.

At step 240, the electronic device can find a matching cluster of documents to which the obtained document can be added, or to create a new cluster if no matching cluster is found. The electronic device can access, for example, a database of document clusters (hereinafter, "clusters") which can be stored remotely and/or on the electronic device, in a volatile memory (e.g., in main memory 106) and/or in a non-volatile memory (e.g., in storage device 150). In some embodiments, each cluster can represent or be associated with one or more documents, such as documents previously processed by the electronic device. In some embodiments, the database can store, for each cluster, information identifying the documents contained in the cluster (e.g., title, publication date, URL, etc.) and a vector representing a hypothetical, idiosyncratic document of the cluster. The vector representing the cluster can be, for example, a centroid vector of the vectors of all the documents within the cluster, or any other vector or expression that provides a good approximation of the vectors of the documents in the cluster. In some embodiments, the database can also store, for each cluster, the individual vectors for each of the documents and/or the similarities (e.g., cosine similarities) between the individual vectors and the representative vector. In some embodiments, the electronic device can also store, for each cluster, the cluster's weight, the cluster's score, and whether the cluster is active or inactive, as further discussed below.

Finding a matching cluster for the obtained document can include calculating similarities between each of the active clusters and the obtained document. To calculate similarities, the electronic device can calculate, for example, similarities between the vector of the document and the representative vector of each of the active clusters. In some embodiments, the electronic device can calculate the similarity between the vector of the document and each of the stored vectors for the cluster, combining each of the similarities with some function. A level of similarity between two vectors can be measured, for example, using cosine similarity, or any other suitable distance of similarity measure between vectors.

In some embodiments, each cluster can also be associated with (or represented by) a weight. For example, when a new cluster is created, the electronic device can assign a default weight to the new cluster. The electronic device can then periodically (e.g., on a daily basis) decrease each cluster's weight by a predetermined decay factor or according to some other function. In some embodiments, when a cluster's weight falls below a predetermined minimal weight, the electronic device can either keep that cluster in the database but mark it as inactive or, in some embodiments, remove the cluster from the database. In some embodiments, when a new document is added to a cluster, the electronic device can increase the cluster's weight, for example, by a predetermined additive value. The value can be a fixed number, it can be proportionately related to the total number of documents added to the cluster on the same day, or some other function. Thus, clusters to which no or few documents are added for some period of time are likely to drop in weight below a minimal weight and become inactive over time. On the other hand, clusters to which documents are frequently added will remain active for a longer period of time. Because in some embodiments new documents cannot be added to inactive clusters, and are unlikely to be added to active clusters with low weights, for reasons discussed below, the periodic weight decrease mechanism described above causes the clustering of documents that are not only similar in content but are also temporally local, e.g., published around the same time.

In some embodiments, after calculating the similarities between the obtained document and the active clusters, the electronic device can assign the document to one or more clusters based at least on the clusters' similarities and weights. For example, electronic device can calculate a match value for each active cluster, the match value being in direct relation (e.g., directly proportional) to the cluster's similarity to the obtained document (assuming higher similarity values represent higher levels of similarity) and also in direct relation (e.g., directly proportional) to the cluster's weight. For example, each match value can be a product of the cluster's similarity and weight, a linear combination of the cluster's similarity and weight, and so forth. Accordingly, in some embodiments, a document is being matched with a cluster based on how similar the document's content is to the contents of the documents in the cluster, and based on how temporally local the document is to the documents in the cluster. The higher the similarity between the document and the cluster, the less temporally local the document needs to be to still be added to the cluster, and vice versa; the more temporally local the document is with the cluster, the less similar it needs to be to still be added to the cluster.

In some embodiments, the electronic device can select as the matching cluster a cluster having the highest match value, or a cluster having the highest match value above a predetermined match threshold. In other embodiments, the electronic device can first preselect one or more clusters having match values above a predetermined threshold, and then select, among the preselected clusters, a cluster having the highest similarity value. Because of the predetermined threshold, it is possible, in some embodiments, that no cluster is determined by the electronic device to be a matching cluster.

At step 250, the electronic device can add the obtained document to the matching cluster found at step 240, or to a new cluster if no matching cluster was found. In some embodiments, after the electronic device adds the obtained document to a cluster, it can update the database, for example, by updating information identifying documents contained in the cluster and by updating the vector representing the cluster (e.g., a centroid vector) based on the obtained document's vector, such that the updated vector accurately represents all documents in the cluster, including the newly added document. Accordingly, if a new cluster was created and currently only includes the obtained document, that cluster's initial representative vector can be set by the electronic device to be the same as the vector of the obtained document.

After updating the representative vector, the electronic device can also recalculate and update the similarities between the representative vector and each individual document in the cluster, if those similarities are stored in the database. Also, as discussed above, the cluster's weight can be increased by a predetermined additive value, or a default weight can be assigned to the cluster if the cluster was just created.

At step 260, the electronic device can update the score of the cluster to which the obtained document was added. In some embodiments, the score can be based on a combination (e.g., a linear combination) of the following factors: the number of documents contained in the cluster, the similarities (e.g., the average or the total of all cosine similarities) between the cluster's documents and the representative vector, the number of documents that are annotated with special tags indicating their importance (e.g., "contract document", "frontpage article", "frequently accessed document", etc.), or any other factors.

In some embodiments, a cluster's score can also be calculated based on a similarity between a low-IDF vector and the representative vector, where the low-IDF vector can be constructed or obtained by the electronic device from the database or from the statistical model, and can include all tokens within the corpus of documents that are extremely common (and therefore heavily penalized by the IDF term), e.g., whose IDF value is lower than a predetermined threshold. High similarities between the low-IDF vector and cluster's representative vector can indicate that the cluster is well aligned to the overall corpus of documents, and is therefore less likely to be an outlier, and vice versa. Accordingly, in some embodiments, the cluster's score can be in direct relationship with (e.g., directly proportional to) the similarity between the low-IDF vector and the cluster's representative vector.

While in some embodiments each document obtained at step 210 can have a publication date that is more recent that all previously processed documents (e.g., the electronic device can pre-sort the documents by date before performing method 200), in some embodiments, some documents can have a publication date that is older than some previously processed documents. In these embodiments, instead of using the current (most recent) weights and representative vectors in the above-described steps of method 200, the electronic device can use historical weights and vectors corresponding to the state of the clusters on the date of the document's publication. In these embodiments, the electronic device can store, in association with each cluster, its weight, its representative vector, and any other relevant data (e.g., the cluster's score) each time that data is modified, allowing the electronic device to later check these historical data. In some embodiments, historical data can be stored as a series of snapshots, in which each snapshot can represent the entirety of the cluster state (e.g., cluster weight, representative vector, cluster score, which documents are in which cluster, etc.) for each historical date. In other embodiments, historical data can be stored relative to each historical date. For example, historical data can be stored as an incremental delta. When historical data is stored incrementally, the electronic device can determine the cluster state for the next historical date from the cluster state of the previous historical date and the incremental delta.

In some embodiments, method 200 can be performed in parallel for a plurality documents and a plurality of corpora. For example, at step 210, method 200 can obtain a plurality of documents in different corpora. In some embodiments a document can be associated with multiple corpora. The plurality of documents can be preprocessed, e.g. parsed into tokens, independent of the document's corpus. Each document can be associated with a corpus and a representative vector can be determined based on the parsed document and the TF/IDF state for the corpus. Independently for each corpus, method 200 can proceed with steps 240-260 described above to match each document with a cluster in its associated corpus (or open a new cluster), add the document to the cluster, and update the cluster state of the each corpus, e.g. cluster score.

Figure 3:
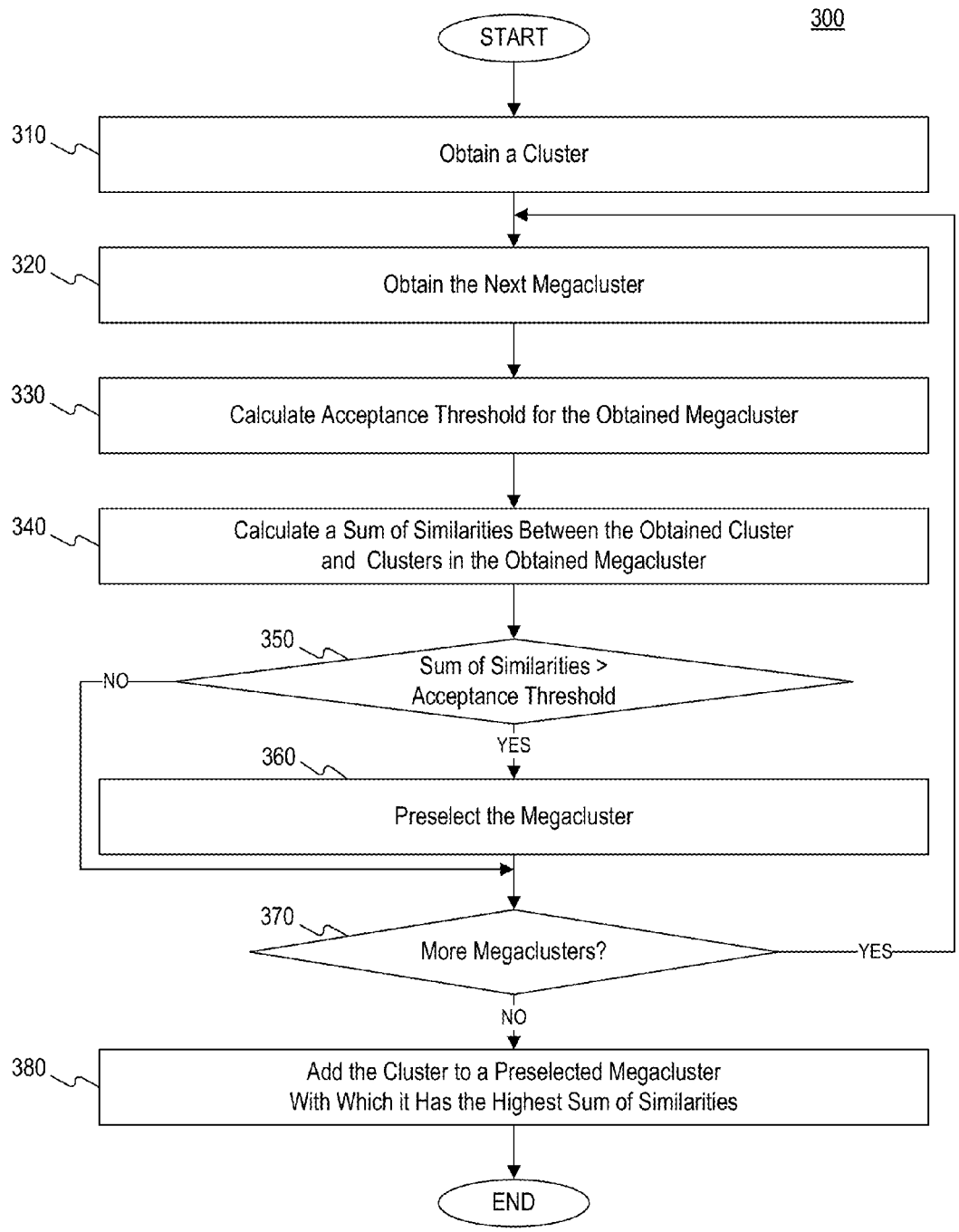
FIG. 3 is a flowchart of an exemplary method for adding a new cluster to a matching megacluster, consistent with embodiments of the present disclosure.

In some embodiments, the electronic device can further group clusters into groups of one or more clusters, hereinafter referred to as megaclusters. FIG. 3 shows a flowchart representing an exemplary method 300 for adding a new cluster to a matching megacluster. In some embodiments, method 300 can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, method 300 can be performed by one or more electronic devices, such as electronic device 110. And while method 300 and the other following embodiments described herein can be performed by multiple electronic devices each having one or more processors, for purposes of simplicity and without limitation, these embodiments will be explained with respect to a single electronic device (e.g., electronic device 110). While the flowchart discloses the following steps in a particular order, it is appreciated that at least some of the steps can be moved, modified, or deleted where appropriate, consistent with the teachings of the present disclosure.

In some embodiments, method 300 can be performed for a cluster after a new document has been added to the cluster. In some embodiments, method 300 can also be performed periodically (e.g., daily, weekly, etc.) for all clusters that are active at the time or that have changed since the last time that method 300 was performed. At step 310, the electronic device obtains the new cluster to be added to a matching megacluster.

At step 320, the electronic device can obtain the next megacluster (or the first megacluster if step 320 is performed for the first time). The electronic device can obtain the next megacluster, for example, from a database of megaclusters, which can be stored remotely and/or on the electronic device, in a volatile memory (e.g., in main memory 106) and/or in a non-volatile memory (e.g., in storage device 150). In some embodiments, each megacluster can represent or be associated with one or more clusters. In some embodiments, the database can store, for each megacluster, information identifying the clusters contained in the cluster, the number of clusters, the total number of documents contained in all the clusters, and so forth.

At step 330, the electronic device can calculate an acceptance threshold for the obtained megacluster. In some embodiments, the acceptance threshold can be in direct relationship (e.g., directly proportional) to the megacluster's size (e.g., the number of clusters and/or documents contained in the megacluster), thereby making the acceptance threshold higher for larger megaclusters and lower for smaller megaclusters. In other embodiments, the acceptance threshold can be a fixed predetermined number. In some embodiments, the acceptance threshold can be time-independent, e.g., it may be independent of the megacluster's creation date or publication dates associated with documents contained in the megacluster's clusters.

At step 340, the electronic device can calculate a sum of similarities between the obtained cluster with each cluster in the megacluster (or only with some clusters in the megacluster), for example, using cosine similarities between the cluster's representative vectors. In some embodiments, instead of adding the similarities together, another function (e.g., a linear combination) representing all the similarities can be used.

At step 350, the electronic device can determine whether the sum of similarities is greater than the acceptance threshold of the obtained megacluster. In some embodiments (not shown in FIG. 3) if the answer is "yes," the electronic device can add the obtained cluster to the obtained megacluster and method 300 can end. In some embodiments, however, if the answer at step 350 is "yes," the electronic device can proceed to step 360 where it can preselect the obtained megacluster and then proceed to step 370. If the sum of similarities is not greater than the acceptance threshold of the obtained megacluster, the electronic device can proceed to step 370 directly, without preselecting the megacluster.

At step 370, the electronic device determines whether there are additional megaclusters in the database, and if so, it proceeds to step 320. Otherwise, the method proceeds to step 380. At step 380, the electronic device can analyze the preselected megaclusters (if any). If only one megacluster has been preselected, then the electronic device can add the obtained cluster to the preselected megacluster. If more than one megacluster has been preselected, then the electronic device can join the preselected megaclusters into a single megacluster, and can add the obtained cluster to the joined megacluster. To prevent the formation of a single megacluster containing all of clusters, the electronic device can also increase the acceptance threshold for the megacluster. If no megacluster has been preselected, e.g., if no megacluster was similar enough to cause the sum of similarities to exceed the acceptance threshold, the electronic device can open a new megacluster and add the obtained cluster to the new megacluster.

In some embodiments, the electronic device can also calculate a score for each megacluster. A score of a megacluster can be, for example, the highest, the average, or the median score among the clusters of the megacluster. The megacluster's score can also depend on the size of the megacluster, or it can be independent of the size of the megacluster. The megacluster's score can also be based on other properties of the clusters or the documents within those clusters, e.g. low-IDF vector similarity or any other factor that can be used to score the cluster.

While the above-described methods can be performed on any types of documents, in some embodiments, the documents can include news articles, where each news article is associated with one or more entities (e.g., Apple, Inc.). As discussed above, an article can have one or more codes or tags (e.g., stock tickers) attached to it, either manually or automatically, where the codes can indicate, for example, which entities are being discussed in the article. In these embodiments, by grouping (e.g., using method 200) news articles that are related to the same entity, that are similar in content, and that are temporally local into the same cluster, the resulting cluster can include mostly or only news articles that are likely to discuss the same particular news event, such as a release of a new iPhone® device. Thus, the electronic device can assist a user who is analyzing vast numbers of news articles (or other documents) by grouping all articles related to the same event.

In addition, by further grouping (e.g., using method 300) similar, but not necessarily temporally local, clusters into megaclusters, the electronic device can further assist the user by grouping different but related events into storylines. Accordingly, for purposes of simplicity, but without limitation, the following examples refer to clusters as "events" and to megaclusters as "storylines."

In some embodiments, grouping documents into clusters (e.g., using method 200) and/or grouping clusters into megaclusters (e.g., using method 300) can be performed by the electronic device responsive to receiving a user input. For example, the user can enter an input requesting information about a particular entity and the electronic device can, responsive to the input, obtain a plurality of documents associated with the particular entity, group those documents into clusters and megaclusters, and present them to the user, e.g., using user interface 400 discussed below.

In some embodiments, however, the electronic device can obtain a corpus of documents and group them into clusters and megaclusters offline (e.g., periodically) before the user specifically requested to group and present that corpus. In some embodiments, the electronic device can place the corpus of documents in a queue. The electronic device can process the queue asynchronously to group the corpus into clusters and megaclusters. For example, the electronic device can periodically obtain a corpus of documents associated with a particular entity (e.g., each document being coded with that entity's code), perform methods 200 and 300 to group that corpus of documents into clusters and megaclusters, and store the results in a local or remote database. In some embodiments, the electronic device can process each document in the queue based on the document's priority. For example, the electronic device can perform separate methods 200 and 300 for documents with different levels of priority, e.g. high-priority and low-priority. To ensure sequential access to cluster state, the electronic device can block the low-priority methods from accessing the cluster state until the high-priority methods are complete. The electronic device can perform such periodic pre-calculations for any entity (e.g., any company or any person), for example, for all companies traded on a particular stock exchange, or only to most popular (e.g., most frequently requested) companies, as determined, for example, by previous requests of a particular user or a plurality of users. The frequency that the electronic device can perform these pre-calculations of clusters or megaclusters can depend on the relative importance of the corpus of documents and the rate at which the electronic device receives these documents. In some embodiments, the electronic device can use, for example, a priority queue to determine which corpus to update the cluster state.

In some embodiments, the electronic device can merge clusters and megaclusters from different corpora. For example, the electronic device can perform a full text search of all the documents in the corpora and determine the most common entities in those corpora. The electronic device can determine which clusters and megaclusters are tagged with these entities and combine clusters or megaclusters with sufficient article overlap.

Figure 4:
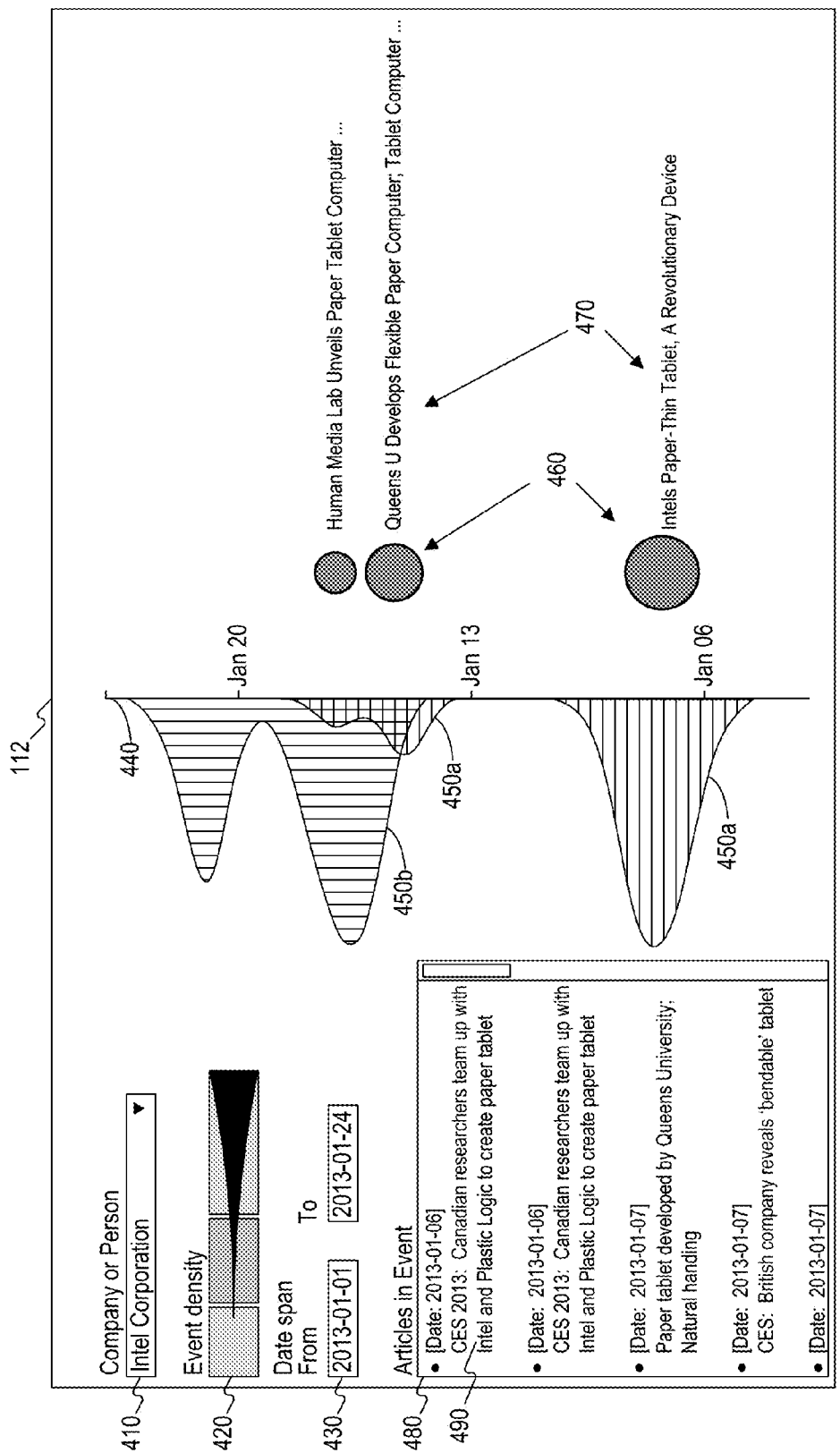
FIG. 4 illustrates an exemplary user interface, consistent with embodiments of the present disclosure.

FIG. 4 illustrates an exemplary user interface 400 provided by the electronic device (e.g., electronic device 110) for display (e.g., display 112) in accordance with some embodiments. User interface 400 can include, for example, an entity selection widget 410, allowing the user to enter text identifying a particular entity (e.g., a person, a company, an industry, etc.) and/or to select a particular entity from a precompiled list of entities, such as dropdown list. In some embodiments, the electronic device can determine which entity the user is interested in without receiving express identification input by the user. Instead, the electronic device can determine the entity of interest based on user behavior, for example, based on the user's most recent search query, or based on display context, for example, based on which articles are currently being displayed on the display. In some embodiments, the electronic device can determine the entity of interest based on the curation of an editor who, for example, can select relevant or interesting entities based on his or her judgment.

User interface 400 can also include a date selection widget 430, allowing the user to select a desired date (or time) range. In some embodiments, date selection widget 430 can include preselected date ranges such as "today," "last week," "last month," "last year," etc. In some embodiments, the electronic device can preset the date range to a default range, such as a range that includes all articles available for the particular entity.

In some embodiments, after the user identifies a desired entity and a desired date range, or after the electronic devices determines the entity and/or the date range automatically as discussed above, the electronic device can automatically obtain a plurality of articles corresponding to that entity (e.g., coded with the entity's code) and corresponding to that date range (e.g., published or last updated within that date range). The electronic device can then group the obtained plurality of articles into events and storylines, for example, by performing method 200 for each article to add that article to a matching event, and then performing method 300 for each event to add that event to a matching storyline. As discussed above, in some embodiments, the electronic device can group all articles for a particular entity into events or storylines ahead of time, and store the event and storyline information in the database, in which case methods 200 and 300 may not need to be performed in real time, allowing the electronic device to display the results faster, e.g., almost instantaneously.

In some embodiments, the electronic device can display the obtained articles, events, and storylines, on a timeline 440. For example, for each obtained storyline the electronic device can display its own graph (e.g., graphs 450a and 450b), each graph being visually distinct from other graphs (e.g., having a different color and/or shading), and the spikes in the graphs representing the volume of documents from that storyline that are associated with (e.g., published on) a particular day. In some embodiments, the user can select a particular storyline, for example, by clicking on or pointing at the corresponding graph with a mouse or another pointing device. When a particular storyline is selected, the electronic device can emphasize its graph and/or de-emphasize graphs of other storylines, e.g., by saturating and/or de-saturating their colors, respectively.

In some embodiments, the electronic device can display next to the timeline and/or next to the graph, events 460 of the selected storyline. For example, each event can be represented by a shape, such as a circle, whose size indicates some measure of the importance of the event (e.g., the score of the corresponding cluster). In some embodiments, event circles can be hidden based on certain criteria. For example, if two clusters are temporally local, the electronic device can display only the circle representing the cluster with the higher cluster score. Events can also be represented by event titles 470, which can be obtained by the electronic device, for example, by finding, within the articles of the corresponding event, tokens having the highest frequencies (e.g., TF/IDF frequency where term frequencies are taken for the set of documents in the cluster instead of for single documents) and then finding a phrase or a sentence containing a majority of those tokens. In some embodiments, events can be represented by the title of one of the articles, for example, by the title that is the most grammatically correct or the most concise, by the title of the earliest document in the cluster, by a title selected by which publication the document appears in using a ranked list of preferences of publication, or by a title based on scoring other codes or tags on the document, or by a title that is selected by a combination (e.g., linear combination) of these criteria. In some embodiments, the electronic device can hide titles. For example, if two clusters are temporally local, the electronic device can display only the title representing the cluster with the higher cluster score.

In some embodiments, the user can also select a particular event within a storyline, for example, by clicking on or pointing at the corresponding event 460 or a spike in the graph corresponding to the event with a mouse or another pointing device. The electronic device can then display information regarding articles 490 included in the selected event, for example, in the article preview window 480. For example, the electronic device can display in article preview window 480 the publication date and the title of each article. In some embodiments, the user can select a particular article 490 (e.g., by clicking), and the electronic device can then display the full article to the user, for example, by opening a new window containing that article. In some embodiments, some articles 490 can be associated with a hyperlink, and the electronic device can open the hyperlink corresponding to the selected article in a browser window. In some embodiments, the articles can be sorted by similarity to the representative vector of the event (cluster), by publication date, by number of clicks or reads of the article, by special tags, e.g., "frontpage article," by social media recommendations, e.g. "Facebook Likes," or by any other sortable category.

In some embodiments, user interface 400 can also include an event density widget 420. The density widget 420 can be a slider, allowing the user to set a range of cluster scores, a range of storyline scores, or both. In some embodiments, the density widget 420 can allow the user to set a range of percentiles, a range of densities, or both. The electronic device can be configured to only display events and storylines that are within the corresponding range of scores. Thus, if too many events and/or storylines are originally displayed by the electronic device, the user can increase the minimum score, and the electronic device will eliminate from display any events and/or storylines, whose score is below the minimum score. In some embodiments, the density widget 420 can be preset to display a fraction of the number of events and stories or a fixed number of events and storylines, e.g., ten. In other embodiments, the density can be preset to display a predefined number of overlapping events, e.g. three.

Figure 5:
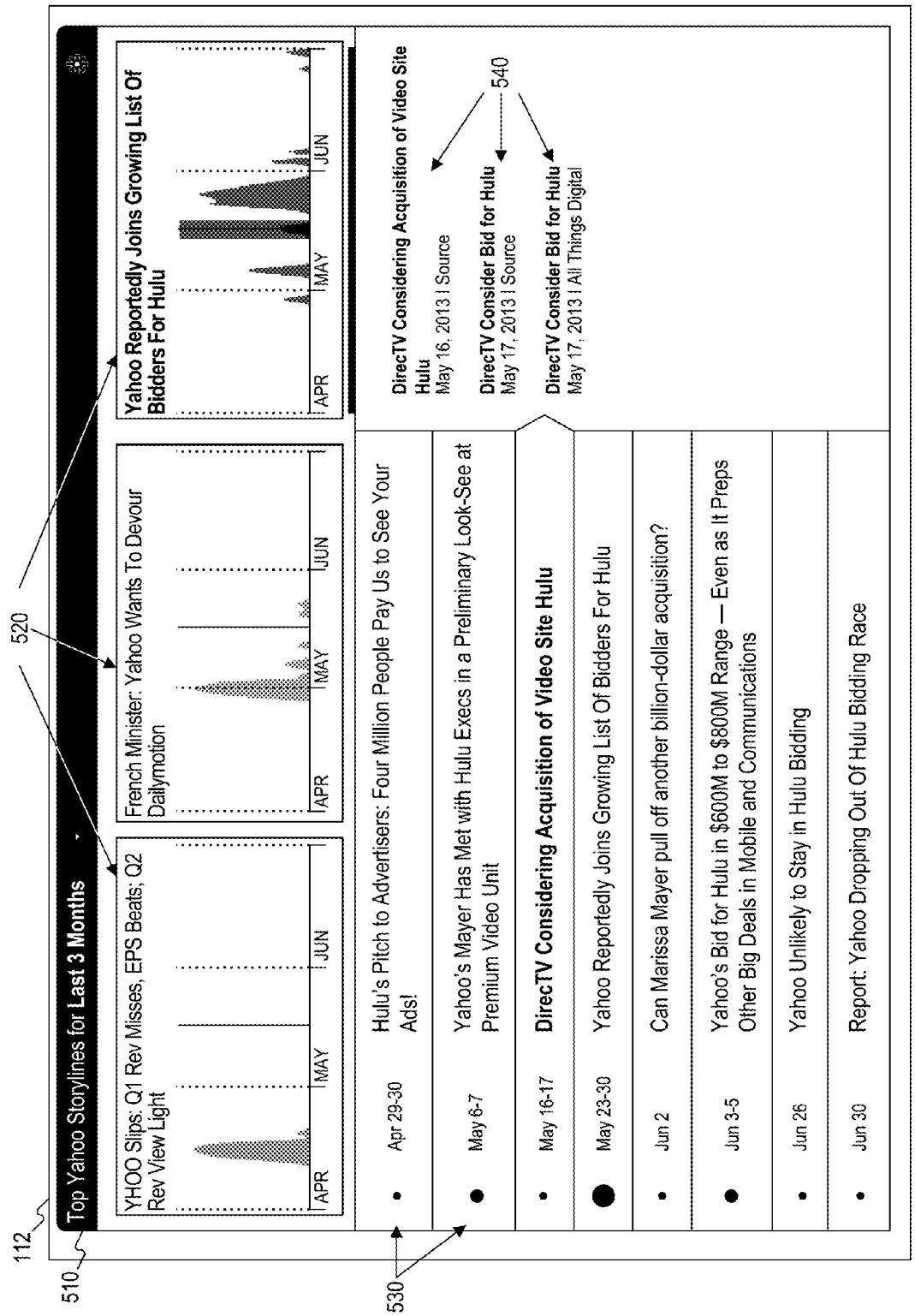
FIG. 5 illustrates another exemplary user interface, consistent with embodiments of the present disclosure.

FIG. 5 illustrates another exemplary user interface 500 provided by the electronic device (e.g., electronic device 110) for display (e.g., display 112) in accordance with some embodiments. User interface 500 does not show the entity selection widget and the date selection widget. Those widgets can be displayed, for example, in a separate window (e.g., at a webpage) and user interface 500 can be displayed, for example, after the user used those widgets to select an entity (e.g., "Yahoo! Inc.") and a date range (e.g., "last three months"), and after the electronic device has obtained the articles, events, and storylines, associated with the entity and date range. In some embodiments, the entity selection widget, the date selection widget, and/or the event density widget can be included in user interface 500.

User interface 500 can contain a title box 510 indicating, for example, the selected entity and date range. In some embodiments, the electronic device can allow the user to change the selected entity and/or date range from title box 510.

User interface 500 can also include one or more storyline preview windows 520, for example, located side by side in a row or in two or more rows (not shown), each storyline preview window 520 including information related to one of the storylines. The information can include the storyline's title, which, in some embodiments, can be the title of the highest-scored event (cluster) within the storyline (megacluster), where the event title can be obtained using methods discussed above. The information can also include a graph representing the articles within the storyline's events, each spike representing some function of the number of articles published on a particular date or the properties of the articles or their clusters (to account for normalization or incorporating scores).

The user can select one of the storyline preview windows, for example, by clicking on or pointing at it with a pointing device. When the user selects a storyline preview window, the electronic device can display one or more event preview boxes 530, positioned, for example, one over another in a column below or above the storyline preview windows 520. Each event preview box 530 can include information about the event, such as the event's title, the event's score (e.g., indicated by a size of a shape displayed in or next to the box), the dates of the earliest and the latest published article within the event, and so forth.

The user can select an event, for example, by clicking on or pointing at the corresponding event preview box with a pointing device, or by clicking on or pointing, in the corresponding storyline preview window, at a date containing articles included in the event. After the user selects an event, the electronic device can display information regarding articles included in the selected event, for example, in the article preview window 540, positioned, for example, next to event preview boxes 530 and below or above storyline preview windows 520. For example, the electronic device can display in article preview window 540 the publication date, the source, and the title of each article, or any other information related to the article. In some embodiments, as discussed above in connection with user interface 400, the user can select a particular article (e.g., by clicking), and the electronic device can then display the full article to the user, for example, by opening a new window containing that article. In some embodiments, some articles can be associated with a hyperlink, and the electronic device can open the hyperlink corresponding to the selected article in a browser window.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. An electronic device comprising:
    one or more computer-readable storage media configured to store instructions; and
    one or more processors configured to execute the instructions to cause the electronic device to:
       obtain one or more user inputs;
       determine, based on the user inputs, an entity and a date range;
       obtain one or more documents associated with the entity and with dates within the date range, the one or more documents being grouped into one or more clusters having a score, and the one or more clusters being grouped into one or more megaclusters;
    present information associated with the one or more documents on one or more timelines, wherein the one or more documents are grouped into different megaclusters being presented in a visually distinct way;
       obtain a selected score range; and
       remove from the presentation information associated with clusters of the one or more clusters having a score not within the score range.

2. The electronic device of claim 1, wherein the one or more processors are further configured to execute the instructions to cause the electronic device to:
    based on a selection of one of the megaclusters, present information associated with the one or more clusters grouped into the selected megacluster.

3. The electronic device of claim 2, wherein the one or more processors are further configured to execute the instructions to cause the electronic device to:
    based on a selection of one of the one or more clusters, present information associated with the one or more documents grouped into the selected megacluster.

4. The electronic device of claim 3, wherein the one or more processors are further configured to execute the instructions to cause the electronic device to:
    based on a selection of one of the one or more documents, present contents of the selected document on a display.

5. The electronic device of claim 3, wherein the one or more processors are further configured to execute the instructions to cause the electronic device to:
    obtain a new user input;
    determine, based on the new user input, an updated entity or an updated date range; and
    update the presented information based on the updated entity or the updated date range.

6. A method performed by one or more processors, the method comprising:
    obtaining one or more user inputs;
    determining, based on the user inputs, an entity and a date range;
    obtaining one or more documents associated with the entity and with dates within the date range, the one or more documents being grouped into one or more clusters having a score, and the one or more clusters being grouped into one or more megaclusters;
    presenting information associated with the one or more documents on one or more timelines, wherein the one or more documents are grouped into different megaclusters being presented in a visually distinct way;
    obtaining a selected score range; and
    removing from the presentation, information associated with clusters of the one or more clusters having a score not within the score range.

7. The method claim 6, further comprising:
    based on a selection of one of the megaclusters, presenting information associated with the one or more clusters grouped into the selected megacluster.

8. The method of claim 7, further comprising:
    based on a selection of one of the one or more clusters, presenting information associated with the one or more documents grouped into the selected megacluster.

9. The method of claim 8, further comprising:
    based on a selection of one of the one or more documents, presenting contents of the selected document on a display.

10. The method claim 8, further comprising:
    obtaining a new user input;
    determining, based on the new user input, an updated entity or an updated date range; and
    updating the presented information based on the updated entity or the updated date range.

11. A non-transitory computer-readable medium storing a set of instructions that are executable by one or more processors of one or more electronic devices to cause the one or more electronic devices to perform a method, the method comprising:
    obtaining one or more user inputs;
    determining, based on the user inputs, an entity and a date range;
    obtaining one or more documents associated with the entity and with dates within the date range, the one or more documents being grouped into one or more clusters having a score, and the one or more clusters being grouped into one or more megaclusters;
    providing information associated with the one or more documents for presentation on one or more timelines, wherein the one or more documents are grouped into different megaclusters being presented in a visually distinct way;
obtaining a selected score range; and
removing from the presentation information associated with clusters of the one or more clusters having a score not within the score range.

12. The non-transitory computer-readable medium of claim 11, further comprising instructions executable by the one or more electronic devices to cause the one or more electronic devices to perform:
based on a selection of one of the megaclusters, providing for presentation information associated with one or more clusters grouped into the selected megacluster.

13. The non-transitory computer-readable medium of claim 12, further comprising instructions executable by the one or more electronic devices to cause the one or more electronic devices to perform:
based on a selection of one of the one or more clusters, providing for presentation information associated with the one or more documents grouped into the selected megacluster.

14. The non-transitory computer-readable medium of claim 13, further comprising instructions executable by the one or more electronic devices to cause the one or more electronic devices to perform:
based on a selection of one of the one or more documents, providing contents of the selected document for presentation on a display.

15. The non-transitory computer-readable medium of claim 13, further comprising instructions executable by the one or more electronic devices to cause the one or more electronic devices to perform:
obtaining a new user input;
determining, based on the new user input, an updated entity or an updated date range; and
updating the presented information based on the updated entity or the updated date range.

* * * * *